(12) United States Patent
Yamashita et al.

(10) Patent No.: US 9,043,507 B2
(45) Date of Patent: May 26, 2015

(54) INFORMATION PROCESSING SYSTEM

(71) Applicant: FUJITSU LIMITED, Kawasaki-shi Kanagawa (JP)

(72) Inventors: Koichiro Yamashita, Hachioji (JP); Hiromasa Yamauchi, Kawasaki (JP); Takahisa Suzuki, Kawasaki (JP); Koji Kurihara, Kawasaki (JP); Fumihiko Hayakawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/890,951

(22) Filed: May 9, 2013

(65) Prior Publication Data

US 2013/0246670 A1    Sep. 19, 2013

Related U.S. Application Data

(63) Continuation of application No. PCT/JP2010/070318, filed on Nov. 15, 2010.

(51) Int. Cl.
| | | |
|---|---|---|
| *G06F 13/28* | (2006.01) | |
| *G06F 13/00* | (2006.01) | |
| *G06F 1/32* | (2006.01) | |
| *G06F 13/32* | (2006.01) | |
| *G06F 13/364* | (2006.01) | |
| *G06F 13/16* | (2006.01) | |

(52) U.S. Cl.
CPC .......... *G06F 1/3275* (2013.01); *G06F 1/3225* (2013.01); *Y02B 60/1225* (2013.01); *G06F 13/32* (2013.01); *G06F 13/364* (2013.01); *G06F 1/3237* (2013.01); *G06F 13/1668* (2013.01)

(58) Field of Classification Search
None
See application file for complete search history.

(56) References Cited

U.S. PATENT DOCUMENTS

| 5,832,280 | A * | 11/1998 | Swanberg | 713/300 |
|---|---|---|---|---|
| 8,762,644 | B2 * | 6/2014 | Castelloe | 711/118 |
| 2003/0159080 | A1 * | 8/2003 | Kiriake | 713/500 |
| 2008/0059817 | A1 * | 3/2008 | Kuwahara | 713/300 |
| 2009/0049245 | A1 * | 2/2009 | Resnick | 711/118 |
| 2009/0182987 | A1 * | 7/2009 | Mejdrich et al. | 712/215 |

FOREIGN PATENT DOCUMENTS

| CN | 1503142 A | 6/2004 |
|---|---|---|
| CN | 101135928 A | 3/2008 |
| JP | 11-110363 A | 4/1999 |
| JP | 11-134077 A | 5/1999 |
| JP | 2003-242104 A | 8/2003 |

(Continued)

OTHER PUBLICATIONS

International Search Report issued in PCT/JP2010/070318, mailed Apr. 5, 2011, 4 pages.

(Continued)

*Primary Examiner* — Michael Sun
(74) *Attorney, Agent, or Firm* — Arent Fox LLP

(57) ABSTRACT

An information processing system includes a CPU that is connected to a bus; a device that is connected to the bus; a memory that is accessed by the CPU or the device; and a power mode control circuit that sets a power consumption mode. The power mode control circuit sets the power consumption mode based on first information that indicates a cache hit or a cache miss of a cache memory in the CPU and second information that indicates an activated state or a non-activated state of the device.

12 Claims, 8 Drawing Sheets

(56) References Cited

FOREIGN PATENT DOCUMENTS

| | | |
|---|---|---|
| JP | 2005-115769 A | 4/2005 |
| JP | 2008-59054 A | 3/2008 |
| JP | 2008-269365 A | 11/2008 |
| JP | 2010-15275 A | 1/2010 |

OTHER PUBLICATIONS

Office Action issued in Japanese Application No. 2012-544020, dated Oct. 15, 2013, 6 pages.
Chinese Office Action issued Feb. 15, 2015; Chinese Application No. 201080070129.X, with English Translation.

* cited by examiner

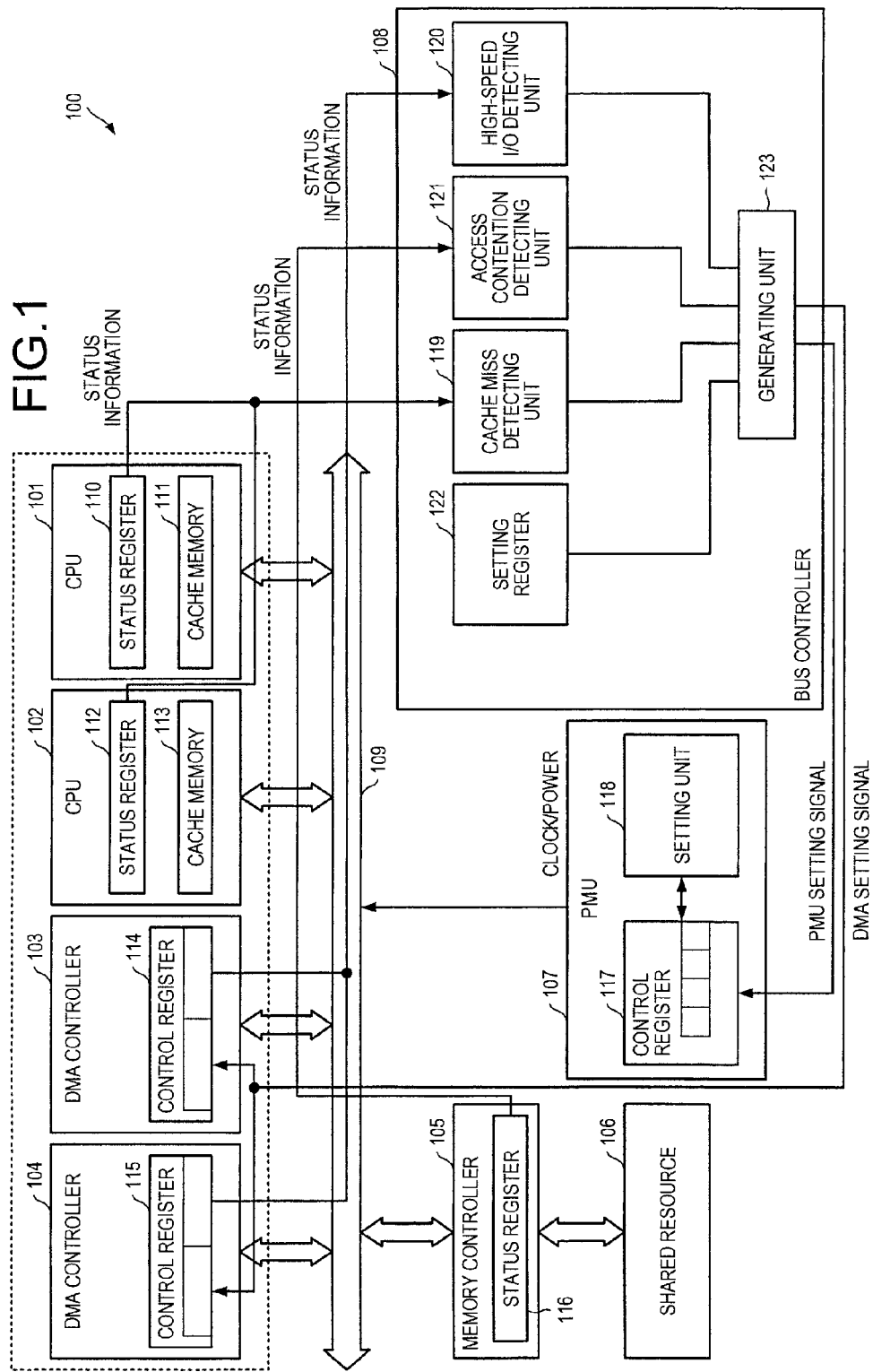

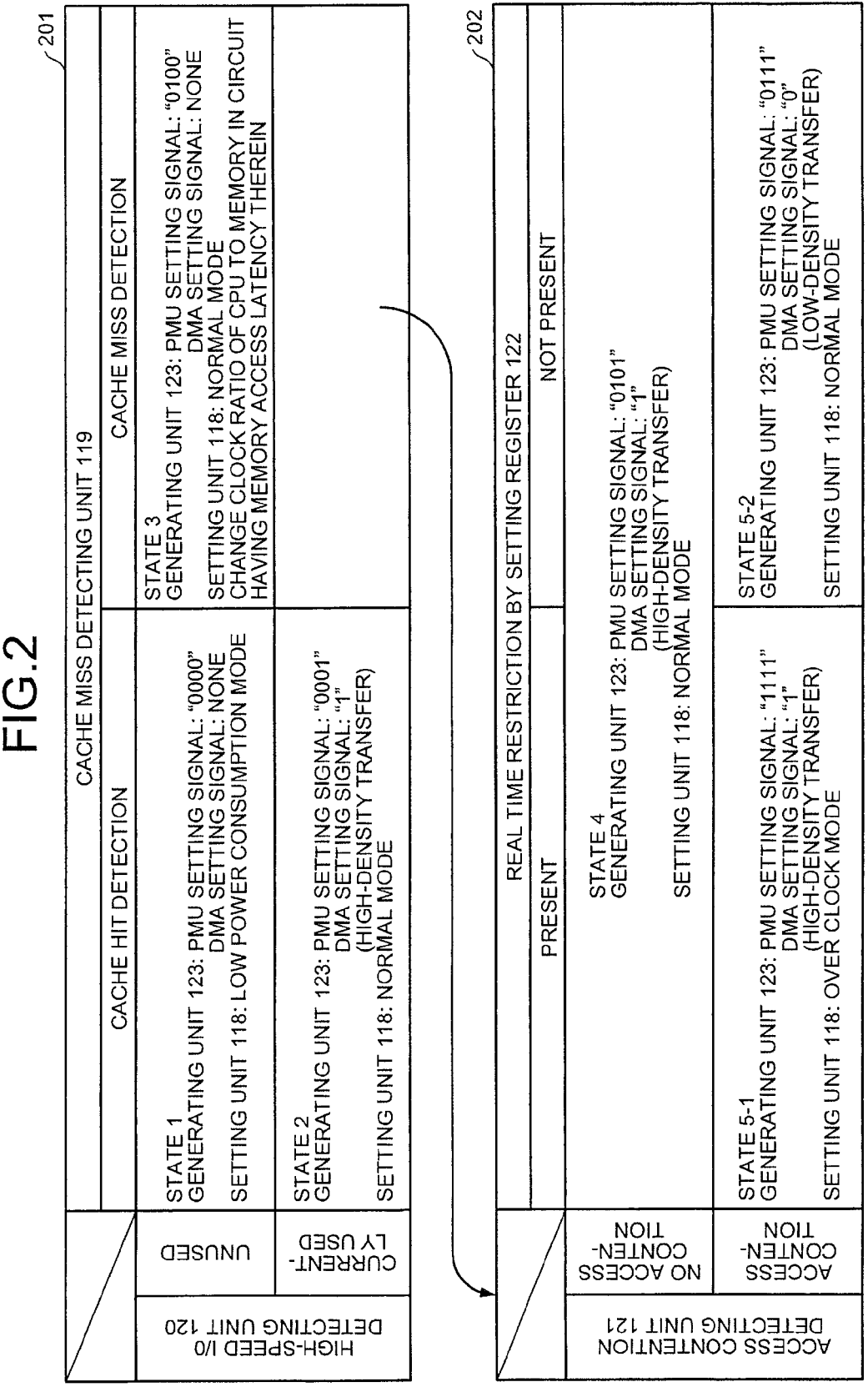

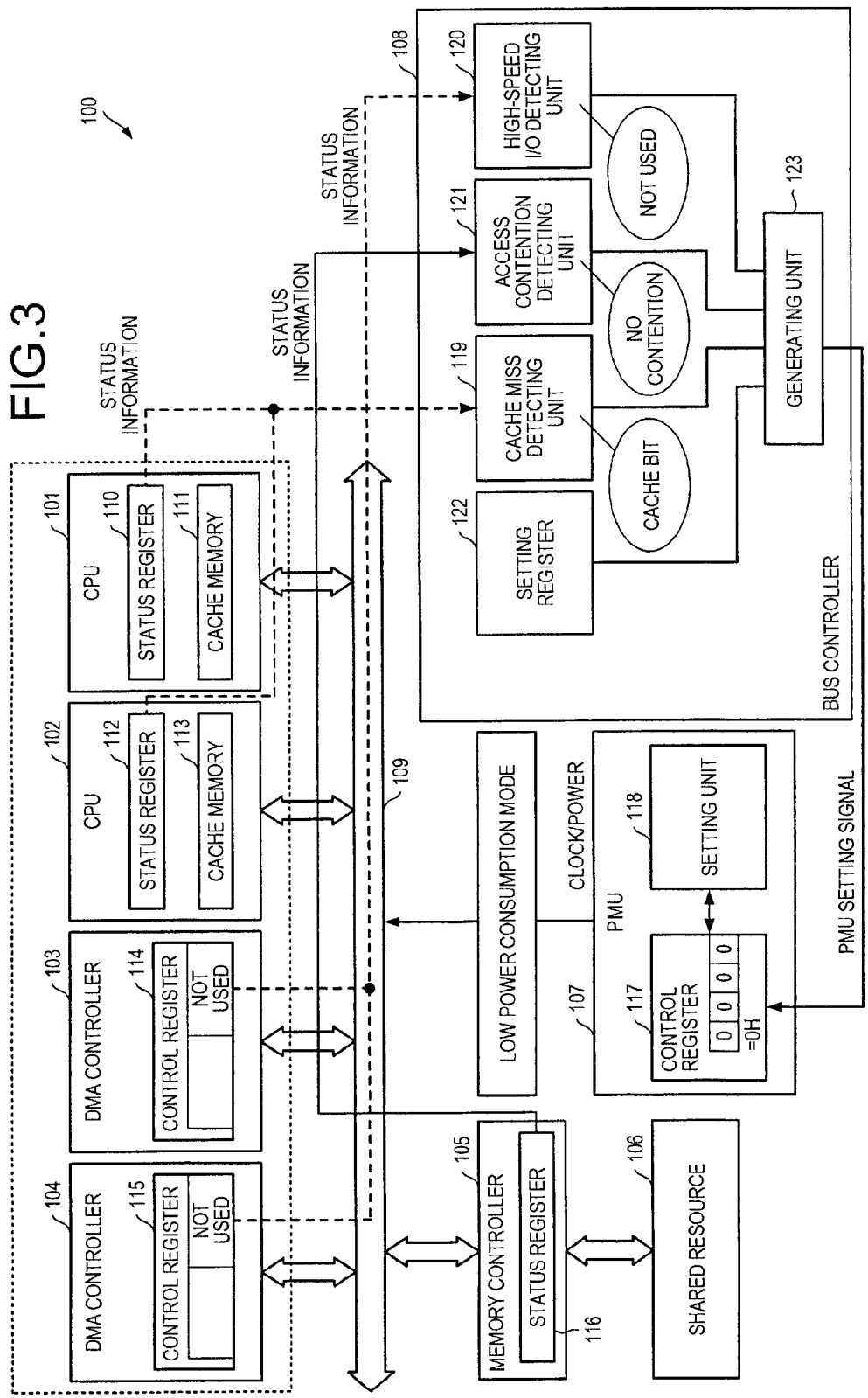

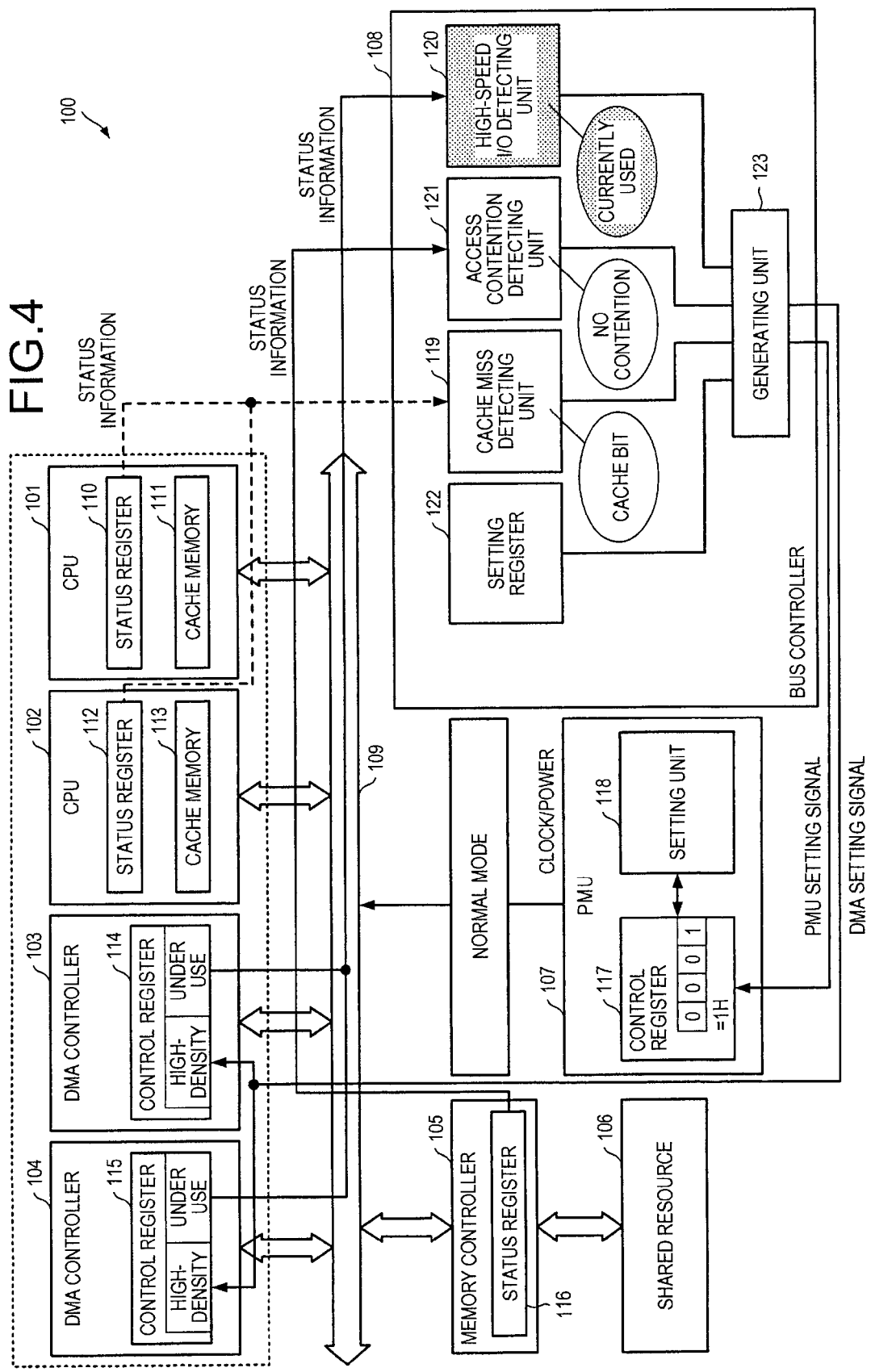

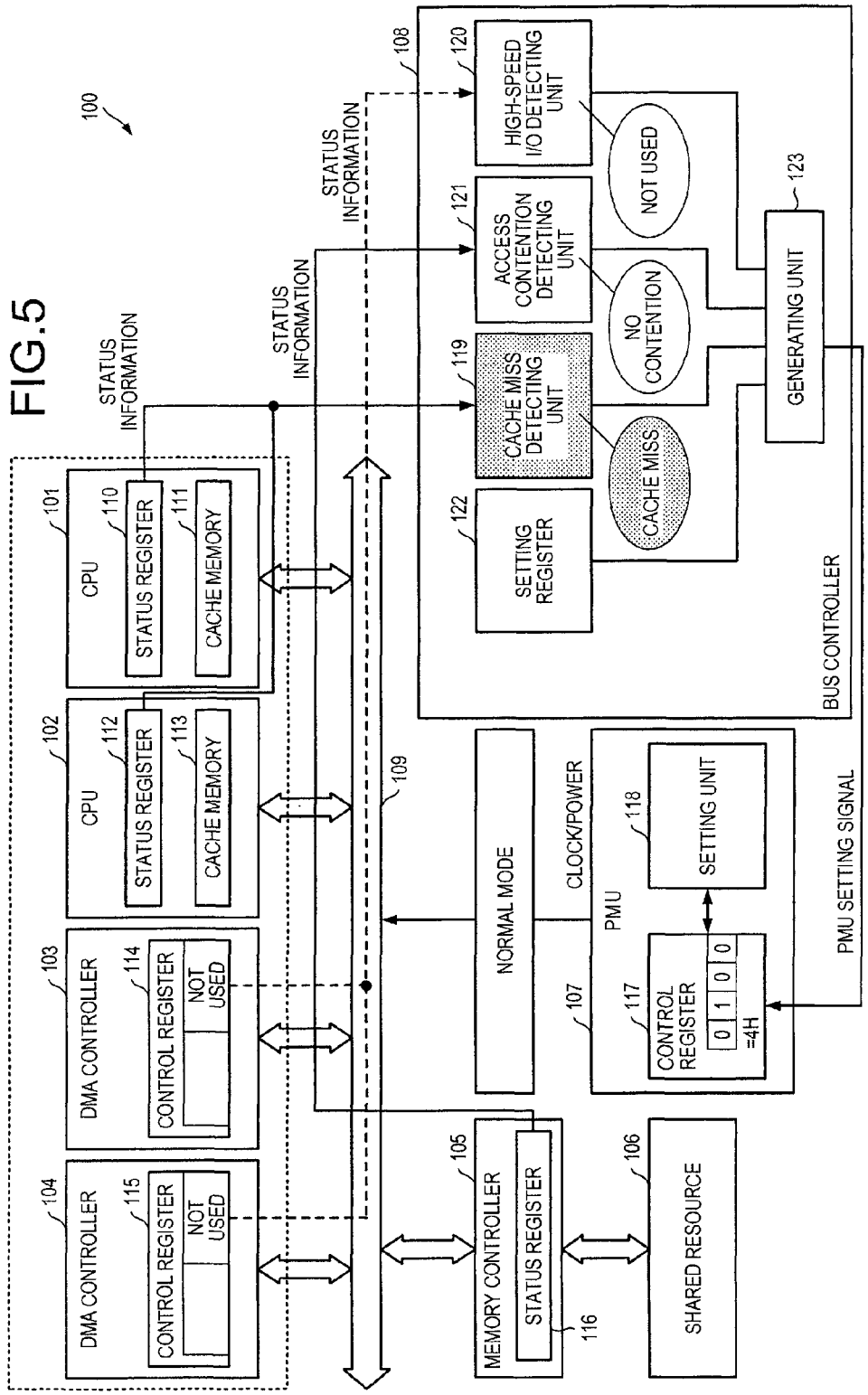

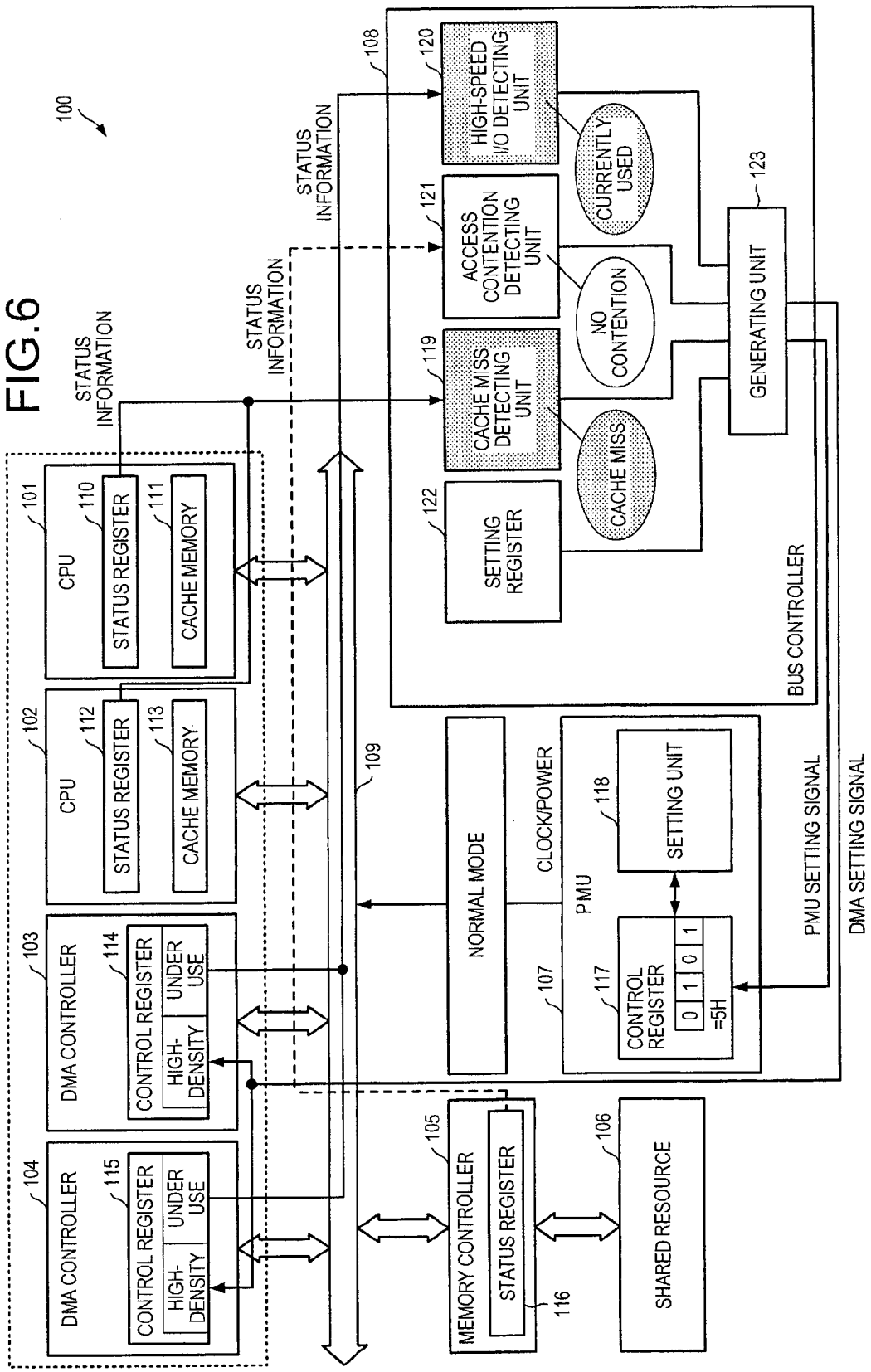

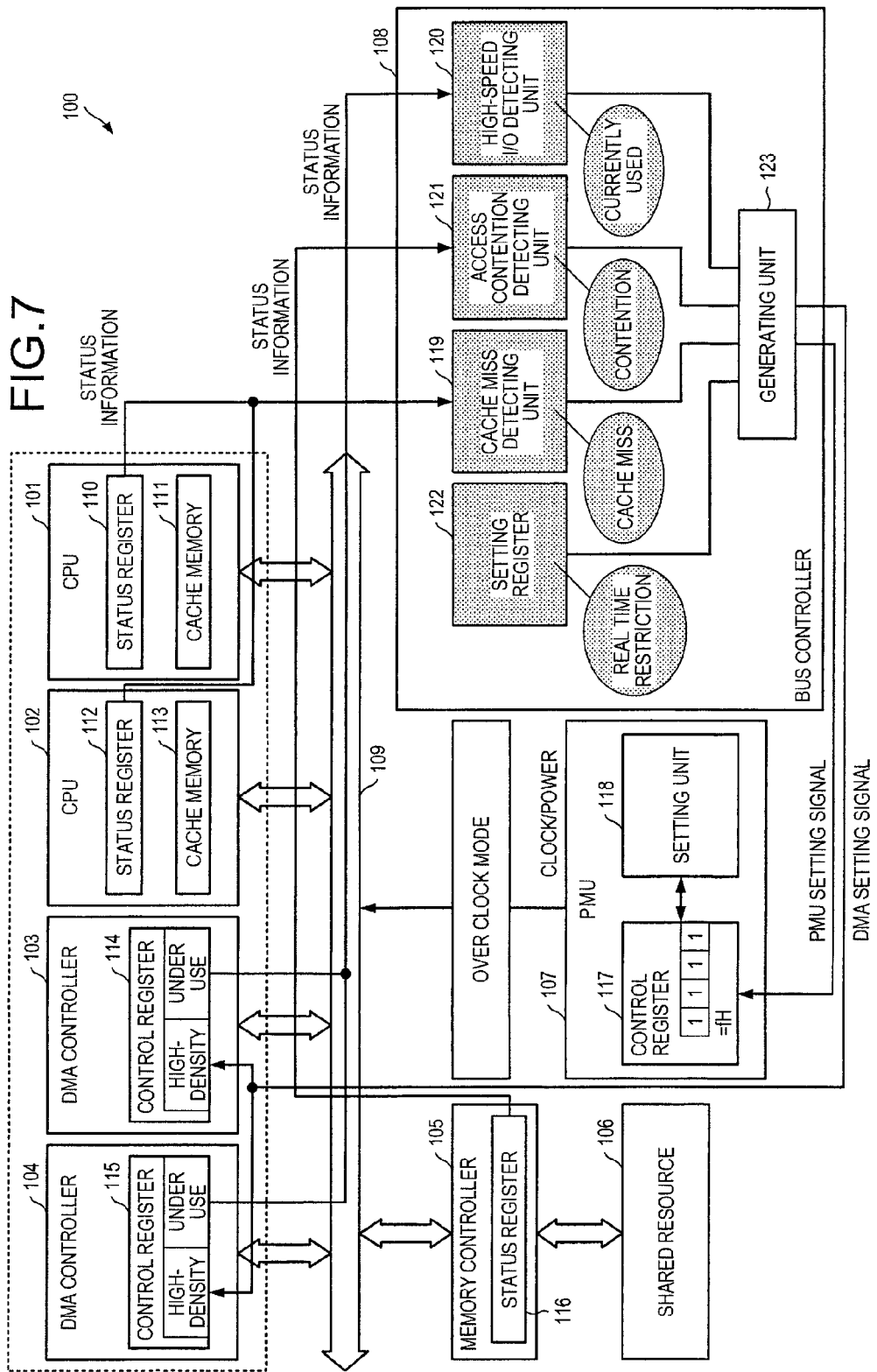

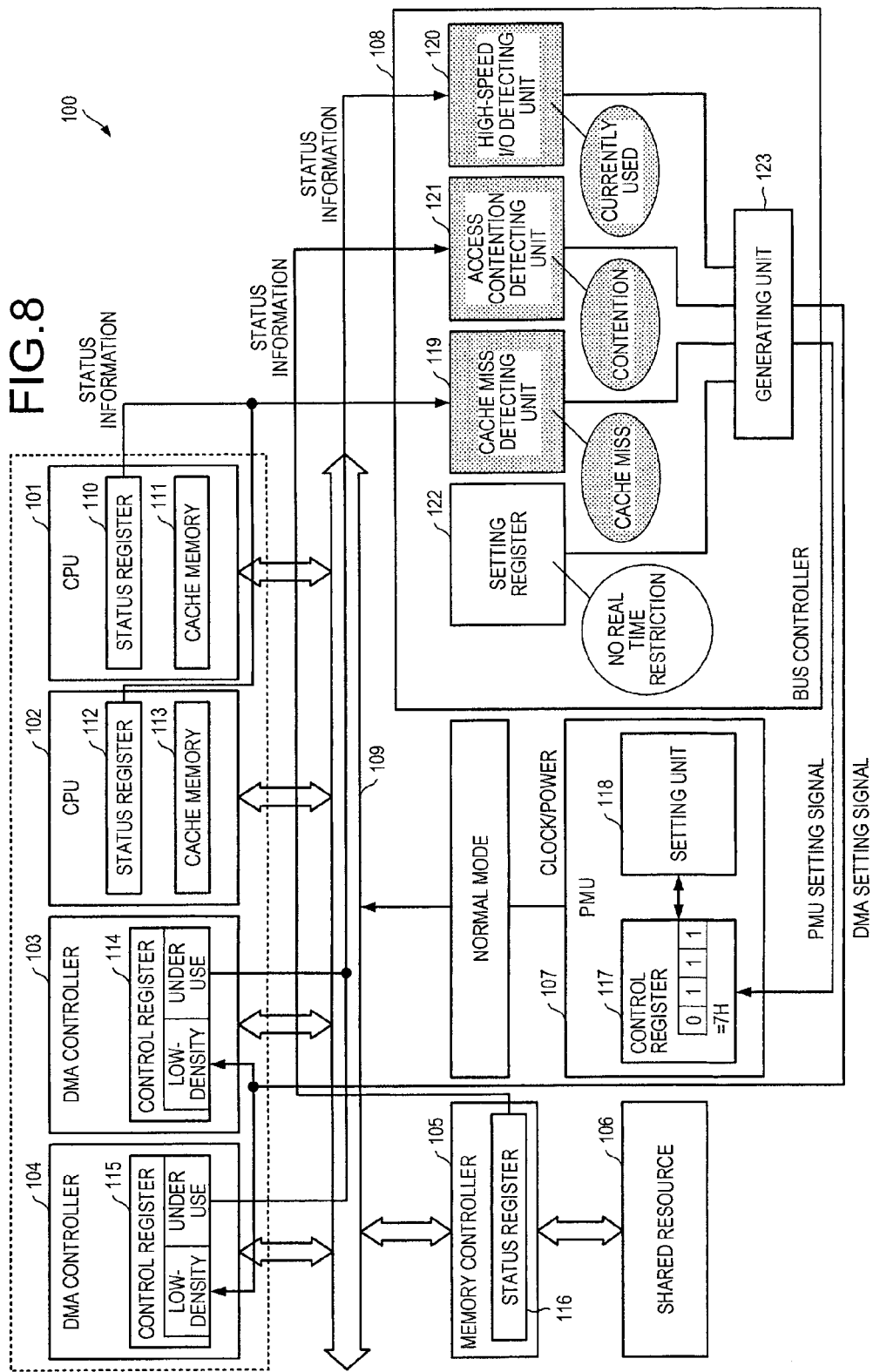

US 9,043,507 B2

INFORMATION PROCESSING SYSTEM

CROSS REFERENCE TO RELATED APPLICATIONS

This application is a continuation application of International Application PCT/JP2010/070318, filed on Nov. 15, 2010 and designating the U.S., the entire contents of which are incorporated herein by reference.

FIELD

The embodiment discussed herein is related to an information processing system that monitors access contention.

BACKGROUND

Information processing systems that employ a multi-core processor system in which one system includes plural cores are recently increasing. A bus in a multi-core processor system carries various patterns of data by and from the cores. For example, data generated by a central processing unit (CPU), a direct memory access (DMA) controller, a digital signal processor (DSP), etc., flow in the bus. Access of memory by a CPU is access of which the transfer volume (i.e., volume of data transferred in one cycle) is small. Access of memory by a high-speed transferring device such as a DMA controller or a DSP is access of which the transfer volume is large.

When an information processing system is designed, design is executed such that the total number of accesses does not overflow with respect to access that is inconsistent with the transfer volume. However, when only one I/O port for items to be input and output is present or when the number of I/O ports therefor is limited, access contention may occur at the one port or each of the ports.

According to a technique to address access contention, the bus width and clock frequency are increased; the speed is further increased; and thereby, access contention is resolved (hereinafter, referred to as "conventional technique 1"). According to another technique, a memory controller controlling the input and output with respect to memory includes a queuing system that temporarily retains an access request and thereby, the effect of access contention is minimized (hereinafter, referred to as "conventional technique 2").

According to still another technique to address access contention, a memory controller monitors cache misses and, when the number of cache misses is greater than or equal to a threshold value, reduces the transfer volume in a cycle stealing mode of the DMA (see, for example, Japanese Laid-Open Patent Publication No. 2010-15275).

However, among the conventional techniques, according to the conventional technique 1, the processing capacity is increased even at times other than when access contention occurs and therefore, a problem arises in that the power consumption increases and utilization efficiency decreases. Even when the conventional technique 2 is applied, a problem arises in that a delay in the response to an access request occurs.

In the technique according to Japanese Laid-Open Patent Publication No. 2010-15275, a problem arises in that, concerning access by a CPU, a DMA controller, a DSP, etc., it is difficult to identify which access is an access by the CPU. In the technique according to Japanese Laid-Open Patent Publication No. 2010-15275, in a case where a process having a real time restriction is under execution and the transfer volume of the DMA controller is reduced, a problem arises in that the transfer efficiency of the DMA controller drops and the real time restriction is highly likely to be violated.

SUMMARY

According to an aspect of an embodiment, an information processing system includes a CPU that is connected to a bus; a device that is connected to the bus; a memory that is accessed by the CPU or the device; and a power mode control circuit that sets a power consumption mode. The power mode control circuit sets the power consumption mode based on first information that indicates a cache hit or a cache miss of a cache memory in the CPU and second information that indicates an activated state or a non-activated state of the device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram of a hardware configuration of an information processing system 100 according to an embodiment;

FIG. 2 is an explanatory diagram of operations of a generating unit 123 and a setting unit 118;

FIG. 3 is an explanatory diagram of operations executed when the information processing system 100 is in state 1;

FIG. 4 is an explanatory diagram of operations executed when the information processing system 100 is in state 2;

FIG. 5 is an explanatory diagram of operations executed when the information processing system 100 is in state 3;

FIG. 6 is an explanatory diagram of operations executed when the information processing system 100 is in state 4;

FIG. 7 is an explanatory diagram of operations executed when the information processing system 100 is in state 5-1; and FIG. 8 is an explanatory diagram of operations executed when the information processing system 100 is in state 5-2.

DESCRIPTION OF EMBODIMENTS

Preferred embodiments of the present invention will be explained with reference to the accompanying drawings.

FIG. 1 is a block diagram of a hardware configuration of the information processing system 100 according to an embodiment. In FIG. 1, the information processing system 100 includes CPUs 101 and 102, and DMA controllers 103 and 104. The information processing system 100 further includes a memory controller 105, a shared resource 106, a power mode control circuit (hereinafter, referred to as "power management unit (PMU)") 107, and a bus controller 108. These components are connected by a bus 109. A display, a keyboard, etc. may be connected to the information processing system 100 as input and output devices operating as interfaces between the system and a user or other apparatuses.

The CPUs 101 and 102 supervise the control of the entire information processing system 100. In this manner, the information processing system 100 takes the form of a multi-core processor system that includes plural cores. The information processing system 100 may be a single-core processor system that includes one core. A multi-core processor system is a computer system that includes a processor having plural cores. In providing the plural cores, a single processor may be employed that has plural cores, or a group of single-core processors connected in parallel may be employed.

The CPU 101 includes a status register 110 and a cache memory 111 that form one of the register groups of the CPU and that store status information indicating the state of the CPU 101. Similarly, the CPU 102 includes a status register 112 and a cache memory 113. The status information stored in the status registers 110 and 112 can be that indicating, for example, a state associated with the execution of a program such as the sign of a calculation result and occurrence of an overflow.

The status registers 110 and 112 each store, as status information, information that indicates whether the CPUs 101 and 102 access the shared resource 106. It is assumed that the transfer of data of the shared resource 106 by the CPUs 101 and 102 is a programmed I/O (PIO) transfer. A case where the PIO transfer occurs is a case where the CPUs 101 and 102 search the cache memories 111 and 113 for data and the requested data is not present and, as a result, the CPUs 101 and 102 access the shared resource 106. In the following description, a case where the data is present in the cache memories 111 and 113 is referred to as "cache hit" and a case where no such data is present is referred to as "cache miss".

Another case in which the PIO transfer occurs, is a case where the CPUs 101 and 102 access the shared resource 106 without searching the cache memories 111 and 113 for the data. This operation is included in the cache misses defined in above. Therefore, reference of the status registers 110 and 112 enables determination as to whether the CPUs 101 and 102 execute a cache hit or a cache miss.

The DMA controllers 103 and 104 are devices that transfer data to the shared resource 106 without using the CPUs 101 and 102. The DMA controller 103 includes a control register 114 that can control the DMA controller 103 by setting a value. Similarly, the DMA controller 104 includes a control register 115. The control registers 114 and 115 respectively have fields to store the status information of the DMA controllers 103 and 104.

The DMA controllers 103 and 104 may each be able to vary the transfer volume thereof, i.e., the amount of data transferred in one cycle. For example, among the DMA controllers 103 and 104, the transfer volume may be equal to the bus width of the bus 109 and the transfer volume may be smaller than the bus width of the bus 109. When the transfer volume is equal to the bus width of the bus 109, the DMA controllers 103 and 104 can transfer data at the highest efficiency. A case where the transfer volume is equal to the bus width of the bus 109 will be referred to as "high-density transfer" and a case where the transfer volume is smaller than the bus width of the bus 109 will be referred to as "low-density transfer".

The memory controller 105 is a device that coordinates contention of the rights to access to the shared resource 106 by the components from the CPU 101 to the DMA controller 104. The memory controller 105 includes a status register 116 that stores the state of the memory controller 105. It is assumed for the information processing system 100 according to the embodiment that limited types of embedded devices of the resource such as a portable terminal are employed and that the one shared resource 106 is sufficient. However, when plural shared resources 106 are present, plural memory controllers 105 may be present.

The shared resource 106 is memory that is accessed by the components from the CPU 101 to the DMA controller 104. The memory is, for example, a read only memory (ROM), a random access memory (RAM), or a flash ROM.

The PMU 107 manages the power consumption of the information processing system 100. For example, the PMU 107 stops the clock to the bus 109 and thereby, a low power consumption mode is established in which the power consumption of the information processing system 100 is reduced. Otherwise, the PMU 107 sets the clock to the bus 109 at a predetermined value and thereby, a normal mode is established. Yet further, the PMU 107 sets the clock to the bus 109 at a clock that is greater than the predetermined value and consequently, an over clock mode is established in which the power consumption of the information processing system 100 increases. The PMU 107 includes a control register 117 that can control the PMU 107 by setting a value, and a setting unit 118 that sets the power consumption mode based on the control register 117.

The bus controller 108 monitors the status information concerning the CPU 101 to the memory controller 105, and changes the setting of each of the DMA controllers 103 and 104, and the PMU 107. The bus controller 108 includes a cache miss detecting unit 119, a high-speed I/O detecting unit 120, an access contention detecting unit 121, a setting register 122, and a generating unit 123.

The cache miss detecting unit 119 has a function of detecting first information indicating a cache hit or a cache miss included in the information stored in the status registers 110 and 112. The cache miss detecting unit 119 detects the first information as a cache miss when at least one of the status registers 110 and 112 indicates a cache miss.

The high-speed I/O detecting unit 120 has a function of detecting second information that indicates an activated state or a non-activated state of a device connected to the bus 109. The term "device" refers to each of the devices that access the shared resource 106 such as a digital signal processor (DSP) and the DMA controller. The high-speed I/O detecting unit 120 according to the embodiment detects as the second information, information that is included in the information stored in the control registers 114 and 115 and that indicates whether each of the DMA controllers 103 and 104 is under use.

For example, the high-speed I/O detecting unit 120 detects the second information, recognizing the state where the DMA controllers 103 and 104 are under use as the activated state and the state where the DMA controllers 103 and 104 are not used as the non-activated state. The high-speed I/O detecting unit 120 detects the second information indicating the activated state when at least one of the DMA controllers 103 and 104 is under use.

The access contention detecting unit 121 has a function of detecting third information that is included in the information stored in the status register 116 and that indicates an access contention-occurring state or non-access contention state for the shared resource 106.

The setting register 122 is a register that sets operation of the bus controller 108. For example, configuration may be such that the setting register 122 is able to set whether the cache miss detecting unit 119 to the access contention detecting unit 121 are caused to function. The setting register 122 may have fourth information that is set therein by an operating system (OS) executed by the CPUs 101 and 102 and that indicates whether a real time restriction is imposed on the information processing system 100. The term "real time restriction" refers to a state where a response time period is set for the processes executed by the CPUs 101 and 102. The fourth information may be set when the information processing system 100 is started up, and the value of the fourth information may be vary after start up and during operation.

The generating unit 123 generates setting signals for the DMA controllers 103 and 104, and the PMU 107 based on the values of the functions components including the cache miss detecting unit 119 to the setting register 122. The setting signals include a PMU setting signal for the PMU 107 and DMA setting signals for the DMA controllers 103 and 104.

For example, the generating unit 123 generates a PMU setting signal that is at least four bits including information concerning the cache miss detecting unit 119 to the setting register 122 as one bit for the PMU 107. The generating unit 123 generates a DMA setting signal that is one bit and that is determined based on a combination of the values of the cache miss detecting unit 119 to the setting register 122, for the DMA controllers 103 and 104. The PMU setting signal and the DMA setting signal will be described in further detail with reference to FIG. 2.

FIG. 2 is an explanatory diagram of operations of the generating unit 123 and the setting unit 118. The setting unit 118 sets operation of the PMU 107 in response to the PMU setting signal generated by the generating unit based on the four values of the cache miss detecting unit 119 to the setting register 122. Operations of the DMA controllers 103 and 104 executed in response to the DMA setting signal generated by the generating unit 123 will also be described with reference to FIG. 2.

Tables 201 and 202 in FIG. 2 depict operations of the generating unit 123 and the setting unit 118 executed in response to the PMU setting signal. For example, the table 201 depicts operations of the generating unit 123 and the setting unit 118 executed based on a combination of the first information and the second information and the table 202 depicts operations of the generating unit 123 and the setting unit 118 executed based on a combination of the third information and the fourth information.

The generating unit 123 generates a PMU setting signal whose zero-th bit to be the least significant bit (LSB) indicates the second information, whose first bit indicates the third information, whose second bit indicates the first information, and whose third bit indicates the fourth information. Hereinafter, it is assumed that when the zero-th bit indicating the second information is "0", this indicates the non-activated state; and when this bit is "1", this indicates the activated state. Similarly, when the first bit indicating the third information is "0", this indicates the non-contention state; and when this bit is "1", this indicates the contention-occurring state. When the second bit indicating the first information is "0", this indicates a cache hit; and when this bit is "1", this indicates a cache miss. When the third bit indicating the fourth information is "0", this indicates an absence of a real time restriction; and when this bit is "1", this indicates a presence of a real time restriction.

A first item in a first line in the table 201 will first be described. When the first information indicates a cache hit and the second information indicates the non-activated state, the generating unit 123 may generate the PMU setting signal to cause the PMU 107 to set the low power consumption mode. The state of the information processing system 100 is referred to as "state 1", which is maintained when the first information indicates a cache hit and the second information indicates the non-activated state. The generating unit 123 does not generate the DMA setting signal when the information processing system 100 is in the state 1.

For example, when the information processing system 100 is in the state 1, the generating unit 123 generates "0000" as the PMU setting signal whose zero-th bit is "0", whose first bit is "0", whose second bit is "0", and whose third bit is "0". The generated PMU setting signal is set in the control register 117.

When the first information indicates a cache hit and the second information indicates the non-activated state, the setting unit 118 may set the low power consumption mode. For example, a case of the state 1 is assumed where both of the CPUs 101 and 102 execute cache hits and both of the DMA controllers 103 and 104 are not used. In this case, the setting unit 118 reads "0000" from the control register 117 and sets the low power consumption mode. When the low power consumption mode is established, the PMU 107 stops the clock to the bus 109. In this case, among the shared resources 106, the supply of a refresh clock concerning a DRAM is continued. Operations of the information processing system 100 concerning the state 1 will be described in detail with reference to FIG. 3.

The first item in the second line in the table 201 will be described. When the first information indicates a cache hit and the second information indicates the activated state, the generating unit 123 may generate the PMU setting signal to cause the PMU 107 to set the normal mode. This state of the information processing system 100 is referred to as "state 2", which is maintained when the first information indicates a cache hit and the second information indicates the activated state. When the information processing system 100 is in the state 2, the generating unit 123 generates, as the DMA setting signal, "1" that indicates the high-density transfer.

For example, when the information processing system 100 is in the state 2, the generating unit 123 generates, as the PMU setting signal, "0001" whose zero-th bit is "1", whose first bit is "0", whose second bit is "0", and whose third bit is "0".

When the first information indicates a cache hit and the second information indicates the activated state, the setting unit 118 may set the normal mode. For example, the state 2 is assumed where both of the CPUs 101 and 102 execute cache hits and one of the DMA controllers 103 and 104 is under use. In this case, the setting unit 118 reads "0001" from the control register 117 and sets the normal mode. Operations of the information processing system 100 concerning the state 2 will be described in detail later with reference to FIG. 4.

The second item in the first line in the table 201 will be described. When the first information indicates a cache miss and the second information indicates the non-activated state, the generating unit 123 may generate a PMU setting signal that causes the PMU 107 to set the normal mode. This state of the information processing system 100 is referred to as "state 3", which is maintained when the first information indicates a cache miss and the second information indicates the non-activated state. When the information processing system 100 is in the state 3, the generating unit 123 does not generate the DMA setting signal. For example, when the information processing system 100 is in the state 3, the generating unit 123 generates "0100" as the PMU setting signal, whose zero-th bit is "0", whose first bit is "0", whose second bit is "1", and whose third bit is "0".

When the first information indicates a cache miss and the second information indicates the non-activated state, the setting unit 118 may set the normal mode. For example, the state 3 is assumed where one of the CPUs 101 and 102 executes a cache miss and both of the DMA controllers 103 and 104 are unused. In this case, the setting unit 118 reads "0100" from the control register 117 and sets the normal mode.

When the information processing system 100 is a circuit having memory access latency, the setting unit 118 varies the clock ratio of the CPUs to the memories. The "circuit having memory access latency" is a circuit for which it takes two or more cycles from issuance of an order to access the memory, until completion of this access of the memory. Operations of the information processing system 100 concerning the state 3 will be described in detail later with reference to FIG. 5.

The second item in the second line in the table 201 will be described. When the second item in the second line is applicable to the cache miss detecting unit 119 and the high-speed I/O detecting unit 120, the generating unit 123 and the setting unit 118 comply with the conditions of the table 202. The first line in the table 202 will first be described. When the first information indicates a cache miss, the second information indicates the activated state, and the third information indicates the non-access contention state, the generating unit 123 may generate a PMU setting signal to cause the PMU 107 to set the normal mode. This state of the information processing system 100 is referred to as "state 4", which is maintained when the first information indicates a cache miss, the second information indicates the activated state, and the third information indicates the non-access contention state. When the information processing system 100 is in the state 4, the generating unit 123 generates, as the DMA setting signal, "1" that indicates the high-speed transfer.

For example, when the information processing system 100 is in the state 4, the generating unit 123 generates "0101" as the PMU setting signal, whose zero-th bit is "1", whose first bit is "0", whose second bit is "1", and whose third bit is "0".

When the first information indicates a cache miss, the second information indicates the activated state, and the third information indicates the non-access contention state, the setting unit 118 may set the normal mode. For example, a case is assumed where one of the CPUs 101 and 102 executes a cache miss; at least one of the DMA controllers 103 and 104 is under use; and the memory controller 105 is in the non-access contention state. In this case, the setting unit 118 reads "0101" from the control register 117 and sets the normal mode. Operations of the information processing system 100 concerning the state 4 will be described in detail later with reference to FIG. 6.

The first item in the second line in the table 202 will be described. When the third information indicates the access contention-occurring state and the fourth information indicates the presence of a real time restriction, the generating unit 123 may generate a PMU setting signal to cause the PMU 107 to set the over clock mode. This state of the information processing system 100 is referred to as "state 5-1", which is maintained when the first information indicates a cache miss, the second information indicates the activated state, the third information indicates the non-access contention state, and the fourth information indicates the presence of a real time restriction. When the information processing system 100 is in the state 5-1, the generating unit 123 generates, as the DMA setting signal, "1" that indicates the high-density transfer.

For example, when the information processing system 100 is in the state 5-1, the generating unit 123 generates "1111" as the PMU setting signal, whose zero-th bit is "1", whose first bit is "1", whose second bit is "1", and whose third bit is "1".

When the first information indicates a cache miss, the second information indicates the activated state, the third information indicates the access contention-occurring state, and the fourth information indicates the presence of a real time restriction, the setting unit 118 may set the over clock mode. For example, at least one of the CPUs 101 and 102 executes a cache miss and at least one of the DMA controllers 103 and 104 is under use. A case is assumed where the shared resource 106 is in the contention-occurring state and a real time restriction is present. In this case, the setting unit 118 reads "1111" from the control register 117 and sets the over clock mode. Operations of the information processing system 100 concerning the state 5-1 will be described in detail later with reference to FIG. 7.

The second item in the second line in the table 202 will be described. When the third information indicates the access contention-occurring state and the fourth information indicates the absence of a real time restriction, the generating unit 123 may generate a PMU setting signal to cause the PMU 107 to set the normal mode. This state of the information processing system 100 is referred to as "state 5-2", which is maintained when the first information indicates a cache miss, the second information indicates the activated state, the third information indicates the access contention-occurring state, and the fourth information indicates the absence of the real time restriction. When the information processing system 100 is in the state 5-2, the generating unit 123 generates, as the DMA setting signal, "0" that indicates the low-density transfer.

For example, when the information processing system 100 is in the state 5-2, the generating unit 123 generates "0111" as the PMU setting signal, whose zero-th bit is "1", whose first bit is "10", whose second bit is "1", and whose third bit is "0".

When the first information indicates a cache miss, the second information indicates the activated state, the third information indicates the access contention-occurring state, and the fourth information indicates the absence of a real time restriction, the setting unit 118 may set the normal mode. For example, at least one of the CPUs 101 and 102 executes a cache miss and at least one of the DMA controllers 103 and 104 is under use. A case is assumed where the shared resource 106 is in the contention-occurring state and a real time restriction is not present. In this case, the setting unit 118 reads "0111" from the control register 117 and sets the normal mode. Operations of the information processing system 100 concerning the state 5-2 will be described in detail later with reference to FIG. 8.

Specific examples will be described with reference to FIGS. 3 to 8 for the states 1 to 5-2 described with reference to FIG. 2. The performance of the information processing system 100 in FIGS. 3 to 8 is as follows. The bus 109 has a bus width of 64 [bits] and operates at a clock frequency of 500 [MHz] that is a predetermined value. Each of the CPUs 101 and 102 has a bus width of 32 [bits] and operates at a clock frequency of 1 [GHz]. It is assumed that the following two settings can be employed for the memory that is one part of the shared resource 106. The first setting is a setting according to which the bus width is 64 [bits], and the clock ratio is 1:1 with respect to the CPUs that operate at the clock frequency of 1 [GHz] and the memory. The second setting is a setting according to which the bus width is 64 [bits], and the clock ratio is 2:1 with respect to the CPUs that operate at the clock frequency of 500 [GHz] and the memory.

Each of the DMA controllers 103 and 104 operates in one of two transfer methods whose transfer volume is "word transfer" and "double-word transfer". When no change is particularly made to the setting, the DMA controllers 103 and 104 execute the double-word transfer. It is assumed in the embodiment that one word corresponds to 32 bits. Therefore, a data amount of 32 [bits] is transferred at one clock in the word transfer and a data amount of 64 [bits] is transferred at one clock in the double-word transfer. A response executed within 10 [milliseconds] as the quality of service (QoS) time period to be the real time restriction is required for "communication arrival" that is one of the processes executed by the information processing system 100.

It is assumed for simplicity of the description that the CPU in which a cache miss occurs is the CPU 101 in FIGS. 3 to 8. Similarly, it is assumed that the used DMA controller is the DMA controller 103.

FIG. 3 is an explanatory diagram of the operations executed when the information processing system 100 is in the state 1. The information processing system 100 depicted in FIG. 3 is in the state 1 where both of the CPUs 101 and 102 executes cache hits and neither of the DMA controllers 103 and 104 are in use. A specific example where the information processing system 100 is in the state 1 can be a case where, when the user does not operate the information processing system 100, and a kernel process, etc. periodically operates and also operates always executing cache hits.

In this case, the bus controller 108 generates a PMU setting signal that is "0000"=0 H and transmits this PMU setting signal to the PMU 107. For the fourth information that is indicated by the third bit, even in a case where the presence of a real time restriction is set in the setting register 122, this setting is used as a determination criterion only when all of the zero-th bit to the second bit are "1". Therefore, the bus controller 108 sets "0", which indicates the absence of a real time restriction. Otherwise, the bus controller 108 may generate a PMU setting signal that is "1000" and the setting unit 118 may handle the third bit as being invalid because not all the bits from the zero-th bit to the second bit are "1". This operation is similarly executed for the states 2 to 4.

The PMU 107 performs setting based on the PMU setting signal and stops the supply of the clock of the bus 109 other than the refresh clock concerning the DRAM of the shared resource 106, as the low power consumption mode. In this manner, the bus 109 is not used in the information processing system 100 in the state 1 and therefore, the supply of the clock can be stopped and the power consumption can be reduced.

FIG. 4 is an explanatory diagram of operations executed when the information processing system 100 is in the state 2. The information processing system 100 depicted in FIG. 4 is in the state 2 where both of the CPUs 101 and 102 execute cache hits and the DMA controller 103 is under use. A specific example where the information processing system 100 is in the state 2 is a case where a download process is executed using the DMA controller 103, the user does not operate the information processing system 100, and the kernel process always operates in the cache hit state.

In this case, the bus controller 108 generates a PMU setting signal that is "0001"=1 H and transmits this PMU setting signal to the PMU 107. The PMU 107 performs setting based on the PMU setting signal and sets the supply of the clock to the bus 109 to be at 500 [MHz] as the normal mode. The bus controller 108 generates a DMA setting signal that is "1" indicating the high-density transfer and transmits this DMA setting signal to the DMA controllers 103 and 104. The DMA controllers 103 and 104 each performing setting based on the DMA setting signal, execute the double-word transfer that is the high-density transfer.

FIG. 5 is an explanatory diagram of operations executed when the information processing system 100 is in the state 3. The information processing system 100 depicted in FIG. 5 is in the state 3 where the CPU 101 executes a cache miss and neither of the DMA controllers 103 and 104 are used. A specific example where the information processing system 100 is in the state 3 is a case where data is searched for in the information processing system 100.

In this case, the bus controller 108 generates a PMU setting signal that is "0100"=4 H and transmits this PMU setting signal to the PMU 107. The PMU 107 performs setting based on the PMU setting signal and sets the supply of the clock to the bus 109 to be at 500 [MHz] as the normal mode. Because it is assumed that the information processing system 100 is a circuit having memory access latency, the clock ratio of the CPU to the memory is set to be 2:1. In the example of FIG. 5, the clock frequency of the memory is reduced to 500 [MHz].

The reason for setting the clock ratio to be 2:1 is that no access of the memory of the shared resource 106 by the DMA controllers 103 and 104 occurs when the information processing system 100 is in the state 3. Therefore, for the setting of the clock ratio, access by the CPUs 101 and 102 alone are taken into consideration. The bus width of each of the CPUs 101 and 102 is 32 [bits] and is a value that is a half of that of the bus width of 64 [bits] of the memory and therefore, the access by the CPUs 101 and 102 can be coped with even when the clock number of the memory is set to be a half of that of each of the CPUs 101 and 102.

In this manner, the information processing system 100 in the state 3 limits access of the memory of the shared resource 106, to access by the CPUs 101 and 102 and thereby, can reduce the clock number of the memory and can reduce its power consumption.

FIG. 6 is an explanatory diagram of operations executed when the information processing system 100 is in the state 4. The information processing system 100 depicted in FIG. 6 is in the state 4, where the CPU 101 executes a cache miss and the DMA controller 103 is under use. A specific example where the information processing system 100 is in the state 4 is a case where a download process is executed in the background and "event reception" via an operation by the user using a menu is received.

In this case, when the CPU 101 is caused to read a hierarchical menu for the first time by the menu operation, the CPU 101 searches the cache memory 111 for data of a new hierarchical menu. The hierarchical menu is to be read for the first time and therefore, is not present in the cache memory 111 and the CPU 101 has to access the shared resource 106. After the hierarchical menu is read, the CPU 101 processes the data corresponding to the menu operation based on the data stored in the cache memory 111. In this manner, in the information processing system 100 that is taken as the specific example in FIG. 6, although a cache miss occurs in the CPU 101, no successive PIOs occur and therefore, the information processing system 100 is in a state where no access contention occurs for the shared resource 106.

In this case, the bus controller 108 generates a PMU setting signal that is "0101"=5 H and transmits this PMU setting signal to the PMU 107. The PMU 107 performs setting based on the PMU setting signal and sets the supply of the clock to the bus 109 to be at 500 [MHz] as the normal mode. The bus controller 108 also generates a DMA setting signal that is "1" indicating the high-density transfer and transmits this DMA setting signal to the DMA controllers 103 and 104. The DMA controllers 103 and 104 each performing setting based on the DMA setting signal, execute the double-word transfer, which is the high-density transfer.

FIG. 7 is an explanatory diagram of operations executed when the information processing system 100 is in the state 5-1. The information processing system 100 depicted in FIG. 7 is in the state 5-1 where the CPU 101 executes a cache miss; the DMA controller 103 is under use; access contention for the shared resource 106 is currently detected; and a real time restriction is present. A specific example where the information processing system 100 is in the state 5-1 is a case where the information processing system 100 executes downloading; data in the information processing system 100 is searched for; and communication arrival occurs. The communication arrival has a real time restriction imposed thereon and therefore, responding within a specific time period is required.

In this case, the bus controller 108 generates a PMU setting signal that is "1111"=fH and transmits this PMU setting signal to the PMU 107. The PMU 107 performs setting based on the PMU setting signal and sets the supply of the clock to the bus 109 to be at 1 [GHz] and also sets the clock frequency of the memory to be 1.5 [GHz] as the over clock mode.

Improvement of the performance of the information processing system 100 enables the information processing system 100 to respond to the communication arrival within the QoS time period of 10 [milliseconds], which is the real time restriction. In this manner, the information processing system 100 in the state 5-1 can resolve access contention and can execute the process within the time period of the real time restriction even when the information processing system 100 is in the access contention-occurring state.

The bus controller 108 generates a DMA setting signal that is "1" indicating the high-density transfer and transmits this DMA setting signal to the DMA controllers 103 and 104. The DMA controllers 103 and 104 each performing setting based on the DMA setting signal, execute the double-word transfer that is the high-density transfer.

FIG. 8 is an explanatory diagram of operations executed when the information processing system 100 is in the state 5-2. The information processing system 100 depicted in FIG. 8 is in the state 5-2 where the CPU 101 executes a cache miss; the DMA controller 103 is under use; the access contention for the shared resource 106 is currently detected; and a real time restriction is not present. A specific example where the information processing system 100 is in the state 5-1 is a case where the information processing system 100 executes downloading and the data is searched for in the information processing system 100.

In this case, the bus controller 108 generates a PMU setting signal that is "0111"=7 H and transmits this PMU setting signal to the PMU 107. The PMU 107 performs setting based on the PMU setting signal and sets the supply of the clock to the bus 109 to be at 500 [MHz] as the normal mode. The bus controller 108 also generates a DMA setting signal that is "0" indicating the low-density transfer and transmits this DMA setting signal to the DMA controllers 103 and 104. The DMA controllers 103 and 104 each performing setting based on the DMA setting signal, execute the word transfer that is the low-density transfer.

Thus, it becomes easy for the PIO transfer by the CPU 101 to be inserted into the data corresponding to the 32 [bits] that is unused because of the switching from the double-word transfer to the word transfer, among the 64 [bits] that is the bus width of the bus 109. As described, when access contention occurs for the memory, the information processing system 100 in the state 5-2 can be adapted to execute the DMA transfer without increasing the power consumption and to execute the PIO transfer by the CPUs 101 and 102.

As described, according to the information processing system, the PMU varies the clock in response to information that is the first information and indicating whether a cache hit or a cache miss occurs and, information that is the second information concerning whether the DMA is under use. Thus, the information processing system can reduce power consumption by resolving memory access contention by setting the over clock when contention occurs, and by stopping the supply of the clock when no access is made. The information processing system according to the embodiment executes no revision for the DMA controller or the memory controller and therefore, the cost can be reduced by the cost of revision.

The access contention can be resolved by determining whether contention occurs using simulations and operating a scheduler of the software, as a method of resolving the access contention. However, according to the method of operating the scheduler of the software, access contention is resolved by transposing the access order of the software and the access contention may not be able to be resolved even when the access order is transposed. The information processing system according to the embodiment can resolve access contention even when the access contention can not be resolved by transposing the access order. The information processing system according to the embodiment executes no revision for the software and therefore, overall costs can be reduced by the cost to cope with the revision and measures corresponding to an upgrading of the version of the OS, etc. need not be executed.

When the first information indicates a cache hit and the second information indicates no device user, i.e., the information processing system is in the state 1, the PMU may set the clock of the bus to be in the low power consumption mode in the information processing system. Thereby, the information processing system can reduce power consumption.

When the first information indicates a cache hit and the second information indicates device use, i.e., the information processing system is in the state 2, the PMU may set the clock of the bus to be in the normal mode in the information processing system. Thereby, when, for example, access contention caused by the CPUs and the DMA controller is resolved and only access by the DMA controller occurs, the information processing system can reduce power consumption by returning the clock of the bus to the normal clock.

When the information processing system is indicated to be in the state 2, the information processing system may set the DMA controller to execute the high-density transfer. When the information processing system is in the state 2, no PIO transfer occurs and therefore, efficient data transfer can be executed by setting the DMA controller to execute the high-density transfer.

When the first information indicates a cache miss and the second information indicates no use of a device, i.e., the information processing system is in the state 3, the PMU may set the clock of the bus to be in the normal mode in the information processing system. Thereby, when, for example, the state of access contention caused by the CPUs and the DMA controller is resolved and only access by the CPUs occurs, the information processing system can reduce the power consumption by returning the clock of the bus to the normal clock.

When the first information indicates a cache miss and the second information indicates no use of a device, the information processing system may set the power consumption mode based on the third information that indicates whether the access contention state occurs. Thereby, the information processing system can resolve the access contention by setting the over clock when the memory access contention occurs.

In the information processing system in the state 4 where the third information indicates the non-access contention state, the PMU may set the clock of the bus to be in the normal mode and, when the third information indicates the access contention-occurring state, the PMU may set the clock of the bus to be in the over clock mode. Thereby, the information processing system sets the over clock only during the occurrence of access contention and therefore, can minimize the increase in power consumption.

When the information processing system is indicated to be in the state 4, the information processing system may set the DMA controller to execute the high-density transfer. When the information processing system is in the state 4, one PIO transfer occurs at one time and the occurrence frequency of the PIO transfer is low. Therefore, efficient data transfer can be executed by setting the DMA controller to execute the high-density transfer.

When the third information indicates the access contention-occurring state, the information processing system may set the power consumption mode based on the fourth information that indicates whether a time restriction is imposed on the processes executed by the CPUs, thereby enabling the information processing system to set the over clock to resolve the access contention only when a real time response having a time restriction is executed.

In the information processing system in the state 5-1 where the fourth information indicates that a time restriction is present, the PMU may set the clock of the bus to be in the over clock mode and, in the state 5-2 where the fourth information indicates that the time restriction is not present, the PMU may set the normal mode. Thus, the information processing system sets the over clock only when access contention occurs and the real time restriction is present and therefore, can minimize increases in power consumption.

When the information processing system is indicated to be in the state 5-1, the information processing system may set the DMA controller to execute the high-density transfer and, when the information processing system is indicated to be in the state 5-2, the information processing system may set the DMA controller to execute the low-density transfer. Thus, the information processing system in the state 5-1 can execute efficient data transfer because the real time restriction is present and can comply with the real time restriction. The information processing system in the state 5-2 can resolve the access contention because the PIO transfer becomes easily executed by executing the low-density transfer.

The bus controller 108 described in the present embodiment can be realized by an application specific integrated circuit (ASIC) such as a standard cell or a structured ASIC, or a programmable logic device (PLD) such as a field-programmable gate array (FPGA). Specifically, for example, functional units (cache miss detecting unit 119 to generating unit 123) of the bus controller 108 are defined in hardware description language (HDL), which is logically synthesized and applied to the ASIC, the PLD, etc., thereby enabling manufacture of the bus controller 108.

According to the information processing system, an effect is achieved that, when access contention occurs, the access contention can be prevented by setting an over clock and, when no access is made, the clock supply can be discontinued and the power consumption can be reduced.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
a central processing unit (CPU) connected to a bus;
a device connected to the bus;
a memory configured to be accessed by the CPU or the device; and
a power mode control circuit configured to set a power consumption mode, wherein the power mode control circuit sets the power consumption mode based on whether a time restriction is imposed on a process executed by the CPU, when a cache miss occurs in a cache memory in the CPU, the device is in an activated state, and an access contention occurs in the bus.

2. The information processing system according to claim 1, wherein the power mode control circuit configured to set a low power consumption mode when a cache hit occurs in the cache memory and the device is in a non-activated state.

3. The information processing system according to claim 1, wherein the power mode control circuit configured to set a normal mode when a cache hit occurs in the cache memory and the device is in the activated state.

4. The information processing system according to claim 1, wherein the power mode control circuit configured to set a normal mode when the cache miss occurs in the cache memory and the device is in a non-activated state.

5. The information processing system according to claim 1, wherein the power mode control circuit configured to set the normal mode when no access contention occurs in the bus.

6. The information processing system according to claim 1, wherein the device includes a direct memory access (DMA) controller and is set to be in a DMA transfer mode.

7. The information processing system according to claim 1, wherein the power mode control circuit is configured to set the over clock mode when the time restriction is present, and set the normal mode when the time restriction is not present.

8. The information processing system according to claim 1, wherein
the device includes a direct memory access (DMA) controller, and
a transfer volume of the DMA controller is set to be a bus width of the bus when the time restriction is present, and the transfer volume is set to be a value less than the bus width of the bus when the time restriction is not present.

9. An information processing system comprising:
a central processing unit (CPU) connected to a bus;
a device connected to the bus;
a memory connected to the CPU and the device via the bus;
a bus controller configured to monitor access of the bus; and
a power mode control circuit configured to set a power consumption mode based on a setting signal from the bus controller, wherein the bus controller includes:
a first circuit configured to detect whether a cache miss occurs in a cache memory in the CPU;
a second circuit configured to detect whether the device is in an activated state;
a third circuit configured to detect whether the CPU successively accesses the memory; and
a fourth circuit configured to store whether a time restriction is imposed on a process executed by the CPU, and
the bus controller sets the setting signal based on a result of detection performed by the fourth circuit, when a result of detection performed by the first circuit, the second circuit, and the third circuit indicates that the cache miss occurs in the cache memory, the device is in the activated state, and the access contention occurs in the bus.

10. The information processing system according to claim 9, wherein the bus controller is further configured to include a fifth circuit that generates the setting signal based on a result of detection performed by the first circuit, the second circuit, the third circuit, and the fourth circuit.

11. The information processing system according to claim 9, wherein
the first circuit detects whether the cache miss occurs in the cache memory based on an output of a status register in the CPU, and
the second circuit detects whether the device is in the activated state based on an output of a control register in the device.

12. The information processing system according to claim 9, wherein the third circuit is configured to detect whether the CPU successively accesses the memory based on an output of a status register in a memory controller that controls the memory.

* * * * *